Figure 1:
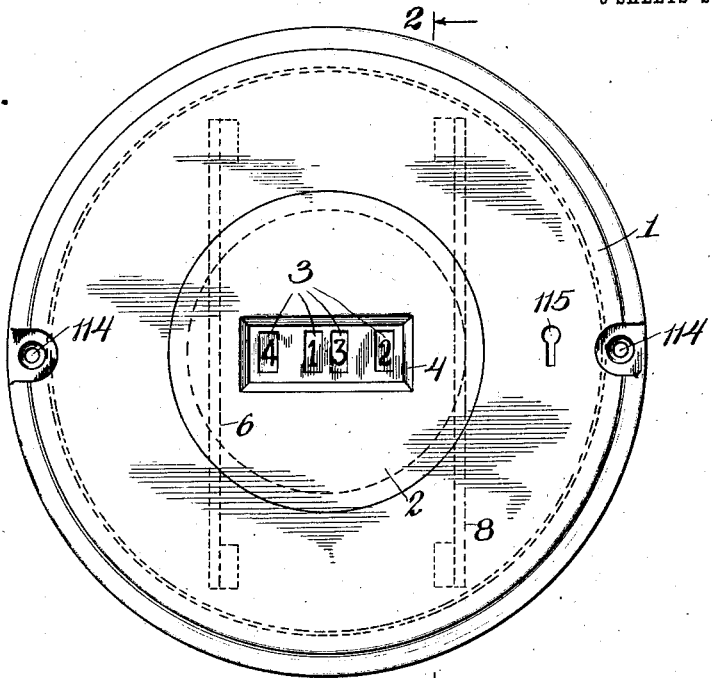

H. T. GOSS & J. W. BRYCE.
TIME RECORDER AND INDICATOR.
APPLICATION FILED JUNE 18, 1909.

1,061,607.

Patented May 13, 1913.
5 SHEETS—SHEET 1.

WITNESSES:
John O. Templer
W. A. Hutton

INVENTORS
Harry T. Goss,
James W. Bryce,
BY Kenyon & Kenyon,
their ATTORNEYS.

H. T. GOSS & J. W. BRYCE.
TIME RECORDER AND INDICATOR.
APPLICATION FILED JUNE 18, 1909.
1,061,607.
Patented May 13, 1913.
5 SHEETS—SHEET 2.
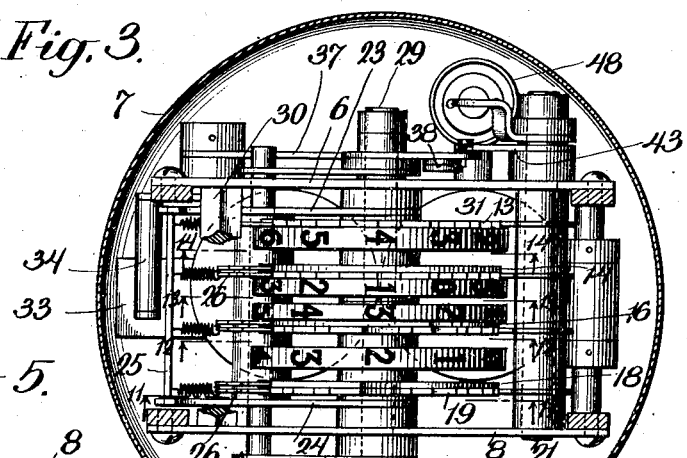
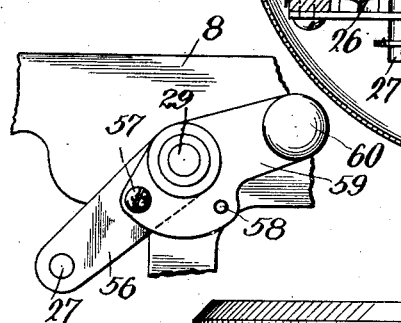
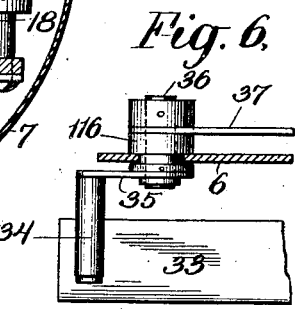
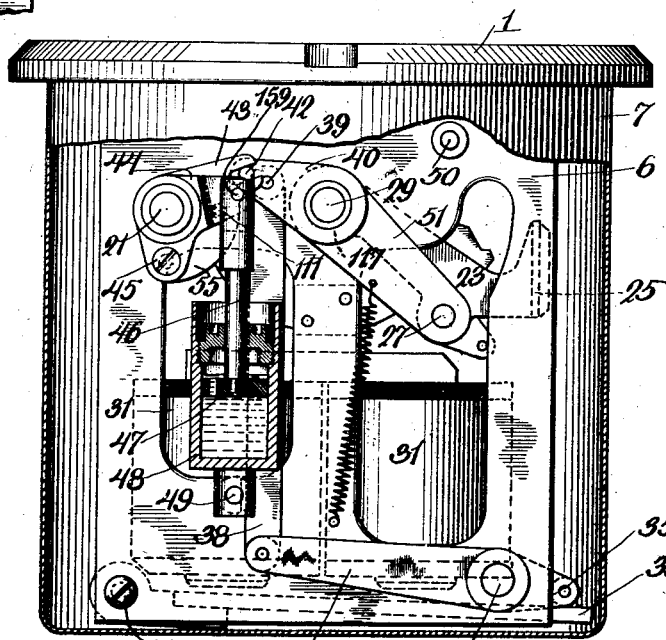
WITNESSES:
John O. Gempler
W. A. Hutton
INVENTORS
Harry T. Goss,
James W. Bryce,
BY
Kenyon & Kenyon,
their ATTORNEYS

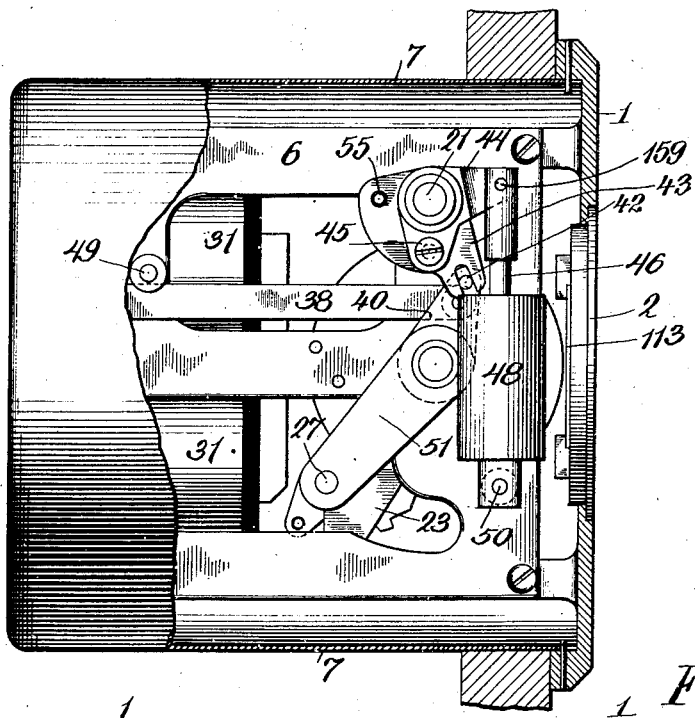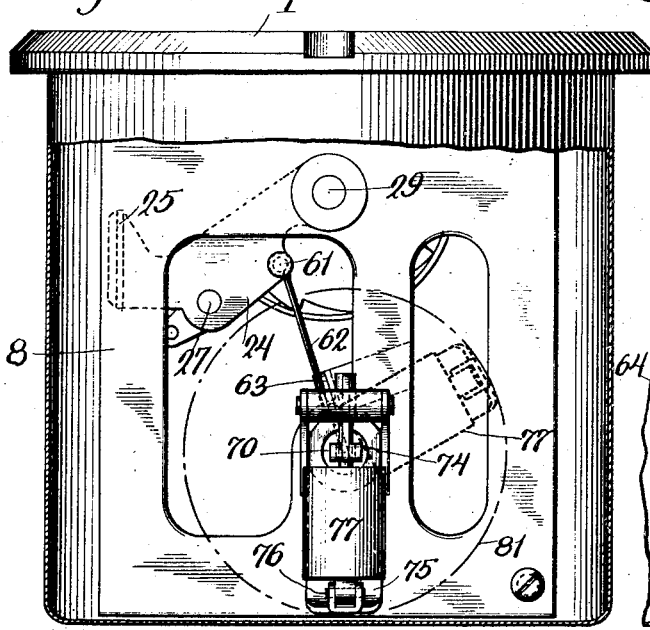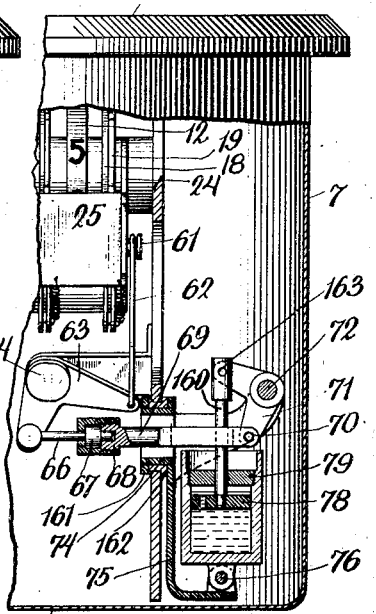

H. T. GOSS & J. W. BRYCE.
TIME RECORDER AND INDICATOR.
APPLICATION FILED JUNE 18, 1909.
1,061,607.
Patented May 13, 1913.
5 SHEETS—SHEET 4.
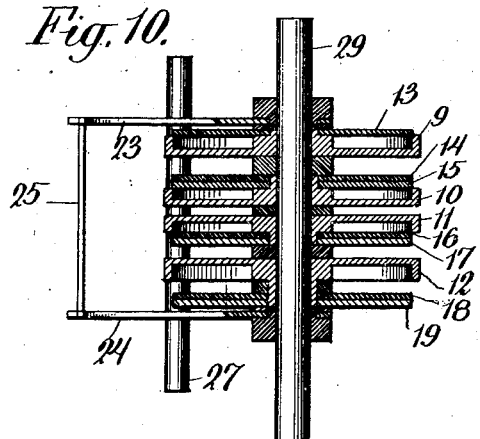
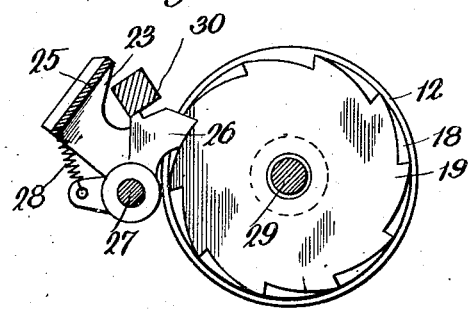
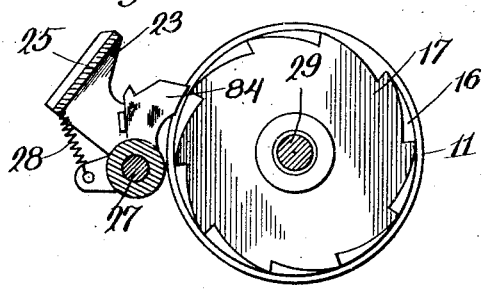
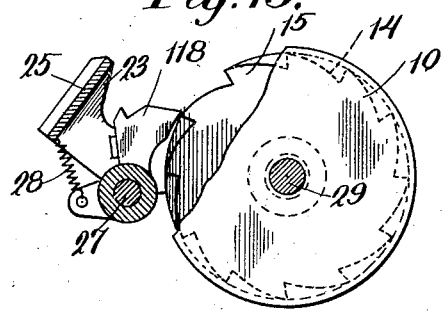
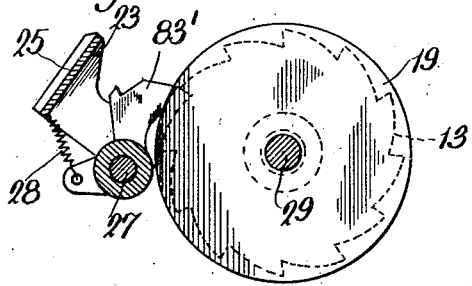
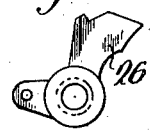
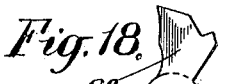
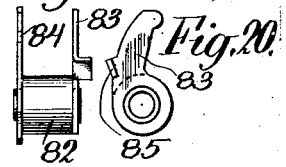
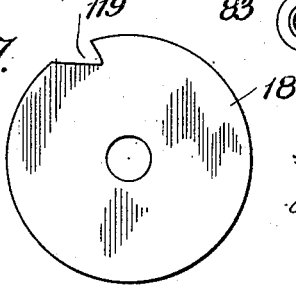
WITNESSES:
John O. Gempler
W. A. Hutton
INVENTORS
Harry T. Goss,
James W. Bryce,
BY
Kenyon & Kenyon,
their ATTORNEYS.

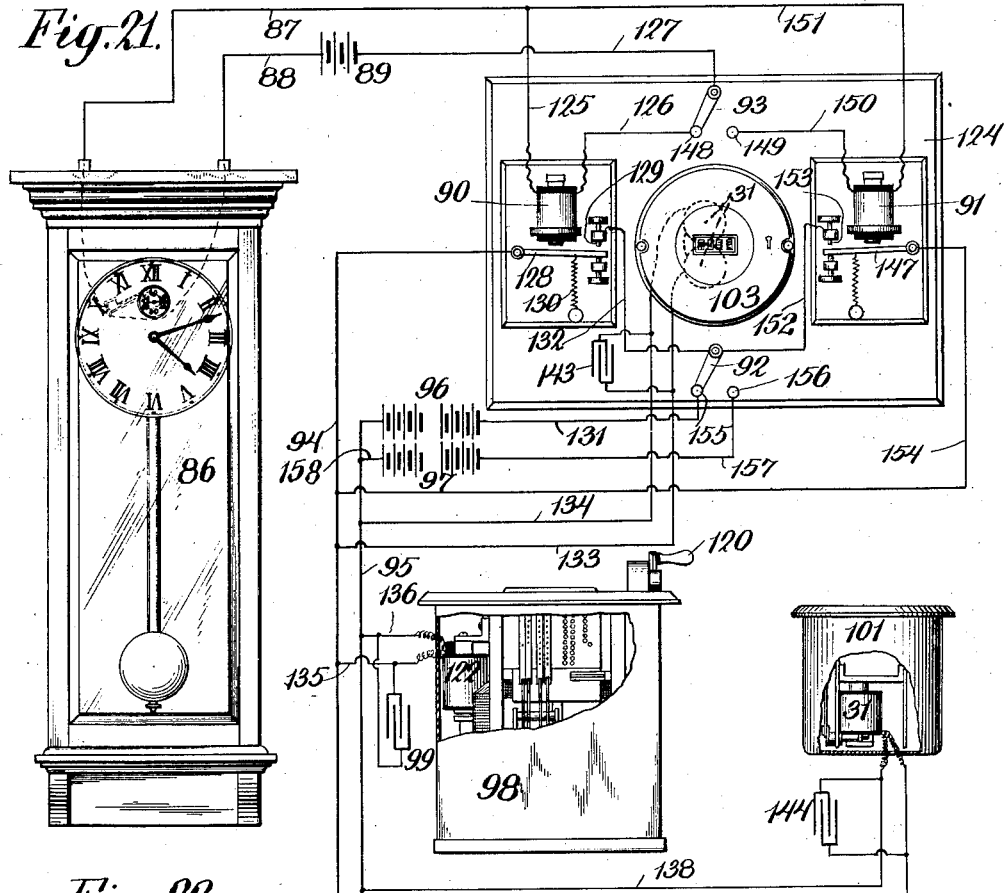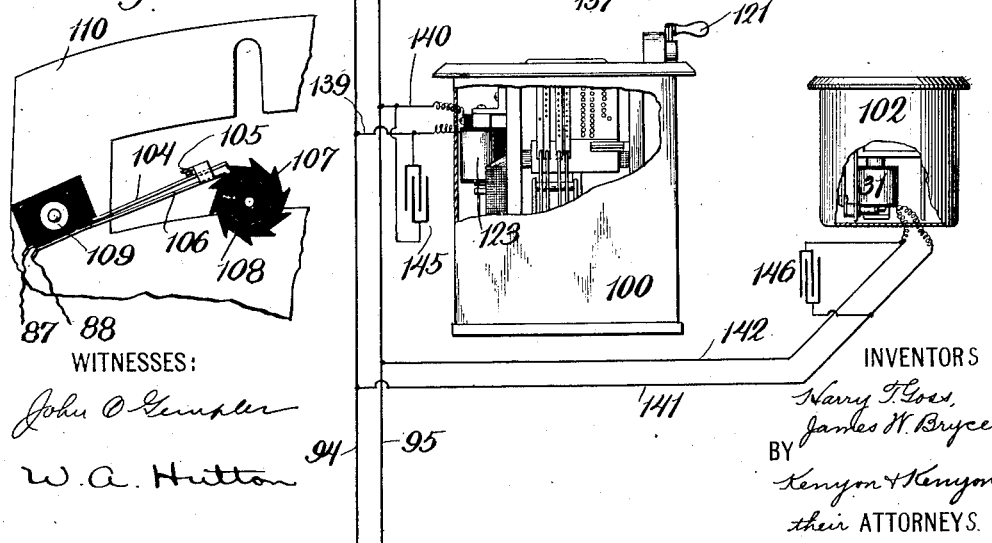

UNITED STATES PATENT OFFICE.

HARRY T. GOSS, OF RUTHERFORD, NEW JERSEY, AND JAMES W. BRYCE, OF BROOKLYN, NEW YORK.

TIME RECORDER AND INDICATOR.

1,061,607. Specification of Letters Patent. Patented May 13, 1913.

Application filed June 18, 1909. Serial No. 502,909.

*To all whom it may concern:*

Be it known that we, HARRY T. Goss and JAMES W. BRYCE, citizens of the United States, the former a resident of Rutherford, in the county of Bergen and State of New Jersey, and the latter a resident of Brooklyn, in the county of Kings and State of New York, have invented certain new and useful Improvements in Time Recorders and Indicators, of which the following is a specification.

Our invention relates to time recorders and indicators and to systems for operating them.

It is shown in the drawings in connection with a system of elapsed time time recorders and is especially valuable in connection with such a system and with such recorders, but in some of its features at least it is not limited to such a system or to use with an elapsed time time recorder or recorders.

Our invention has for its object to provide means for giving synchronous indications at a distance of the operation of a time recorder or an elapsed time time recorder or a plurality or system of them, so as to permit synchronous records to be made at different points, either manually or automatically, or so that the operation of a time recorder or an elapsed time time recorder or any number of them may be checked or verified at a distance; also to provide means for improving the operation of a time recorder, to render such operation more regular, steady and certain; also to improve the feeding devices of such machines and especially to prevent overthrow during the feeding operation; and also generally to improve the parts of time recorders.

It consists of the novel devices herein shown and described.

In the drawings accompanying this specification and forming part hereof, we have shown the preferred form of our invention. It is there shown in connection with a system containing a plurality of elapsed time time recorders and time indicators and electric circuit connections therefor. It will be understood, however, that our invention is not limited to the particular system and apparatus shown and now to be described.

Figure 2:
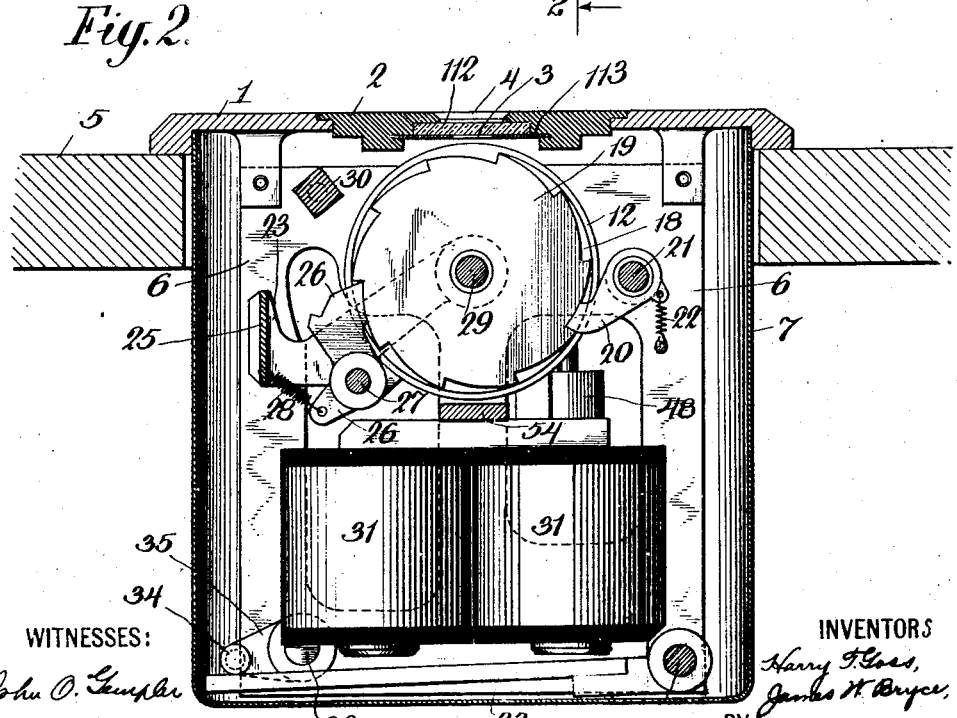

Referring to the particular embodiment of our invention shown in the drawings, Figure 1 is a plan view of a time indicator such as we prefer to use in carrying out our invention. Fig. 2 is a central vertical longitudinal section on the lines 2—2 of Fig. 1. Fig. 3 is a plan view with the top plate removed. Fig. 4 is a side elevation with the case broken away to show the oil dash-pot. Fig. 5 is a detail of the counterweight and connections. Fig. 6 is a detail showing the connection between the armature of magnet 31 and a lever which operates the pawl frame. Fig. 7 is a view similar to Fig. 4, but with the indicator placed on its side and with the dash-pot in its other position so as still to be in a vertical position. Figs. 8 and 9 are views of a dash-pot adapted to assume a vertical position in every position of the instrument. Fig. 10 is a detailed horizontal section through the indicating means and connections. Figs. 11, 12, 13, and 14 are sections on the lines 11—11, 12—12, 13—13 and 14—14 of Fig. 3 respectively. Figs. 15 and 16 are detail views of the tenths of minute pawl. Fig. 17 is a view of the feeding control disk. Figs. 18, 19 and 20 are details of the cross-overs of the pawls for feeding purposes. Fig. 21 shows our preferred system for operating a plurality of machines, this view showing a master clock, a control board and a plurality of elapsed time recorders and time indicators. Fig. 22 is a detail of the electric contacts connected with the clock arbor.

In the use of elapsed time time recorders which compute and record elapsed times automatically when used either singly or in a system of such recorders, it is often useful to know at a point distant from any such recorder the exact time which such recorder is keeping or using for making its records, either for the purpose of verifying or checking the accuracy of such time or for the purpose of making records in absolute synchronism with the time employed by such recorder or by a system of recorders, and also for the purpose of quickly and readily ascertaining when anything is wrong with the system or any of its recorders. Thus, for example, in telephone work, where a system of automatic elapsed time time recorders is used, it is essential that certain manual time entries in reference to a telephone call, say, for long distance connection, for example, or in reference to subsequent steps taken in connection therewith be made and it is very essential that in making such time entries, which often have to be made at a distance from the machine which actually computes and records the elapsed time of the telephone interview, exactly the same time standard be used as that employed in the elapsed time time recorder itself. It is also important in such a telephone recording system and also in automatic elapsed time recording systems used in factories for cost purposes, for example, or for other purposes, that there be located at some point distant from one or more of the recorders, as for example, at a central station or at the office of a factory, a machine which will indicate the standard of time employed in the recording systems, either for purposes of verifying or checking it or for making manual synchronous time entries or for ascertaining readily and quickly any breakdown in the system or any trouble in it or in a time recorder. For these purposes, we have devised a time indicator, which for convenience we shall refer to in the specification and claims as a check time indicator, which will indicate time in exact synchronism with any elapsed time time recorder or system of such recorders and will be adapted to do this at any point, whether near to or distant from such time recorder or recorders. In Figs. 1 to 7 we have illustrated one form of such a machine and in Figs. 8 and 9 another form and in Fig. 21 we have shown a system containing a plurality of such check time indicators and elapsed time time recorders and circuit connections for operating them.

Referring now to the check time indicator shown in Figs. 1 to 7 inclusive, 1 is the top plate of the casing 7 of my preferred form of check time indicator. 2 is a circular plate fitting into a circular opening in top plate 1, and having a rectangular opening 4 provided with a glass plate 112 resting upon an opaque support 113, secured in circular plate 2, support 113 having four openings 3, 3. Beneath these openings are arranged four indicating wheels 9, 10, 11 and 12. These wheels are clock driven and indicate time in hours and minutes, 9 being the hour wheel, 10 the tens of minutes wheel, 11 the minutes and 12 the tenths of minutes. These indicating wheels are adapted to indicate time-of-day. The indication of time shown through the window 4 in Fig. 1 is 4 hours, 13 minutes and 2 tenths. 114 are screw holes in case 7 for holding top plate 1 in position. 115 represents a key-hole, by means of which and by means of any suitable lock (not shown) plate 2 may be locked in position or may be unlocked to permit the ready adjustment of the indicating wheels without removing the top plate.

The indicating wheels may be driven by any suitable clock-controlled means. The specific means shown consists of an electromagnet 31, 31, which is energized and deenergized every tenth of a minute. The means for doing this will be presently described. 33 is its armature. The vibration of the armature every tenth of a minute is transmitted so as to feed tenth of minute wheel 12 forward one unit at each time the magnet 31 is energized and from the tenths of minute wheel 12 the wheels of higher denomination are fed in any usual manner. Armature 33 is pivoted at 32. Upon its other end rests a roller 34 carried on an arm 35, fast to short shaft 36 (Fig. 6), loose in bearing 116 fast to piece 6 forming part of the framework of the machine. Also fast to shaft 36 is an arm 37, which has pivoted to it at its free end a link 38, the latter pivoted at its upper end, at 39, to arm 40 loose on shaft 29. This shaft is fast in bearings in parts 6 and 8 of the framework. Fast on the sleeve 117 of arm 40 is lever 51, sleeve 117, arm 40 and lever 51 being loose on shaft 29.

27 is a rod fast at one end to lever 51, and which also passes through holes in side pieces 23 and 24 of a frame 25.

23, 24 and 25 are fast to one another and constitute a feeding frame for the pawls 26 of the indicating wheels. There is a pawl for each indicating wheel. Each pawl is loosely mounted on rod 27 and has a tail end to which is attached a spring 28 to keep its nose in engagement with a ratchet wheel fast to its indicating wheel.

19 is the ratchet wheel of the tenths of minute indicating wheel and pawl (see Figs. 2, 10 and 11). It is provided with ten teeth and is fast with the tenths of minute indicating wheel 12. Each time magnet 31 is energized, feeding frame 25 is rocked upward, as viewed in Fig. 2, through the armature and its connections just described, and wheels 19 and 12 are fed forward one tooth or unit. Pawl frame 25 lifts each pawl 26, but only the minute pawl is normally in engagement with its ratchet wheel, the others being normally held out of engagement, but being brought into engagement at the proper time when one should be carried from the next lower wheel, as will be presently described. Frame 25 falls downward each time magnet 31 is deënergized.

20 is a pawl for preventing backward rotation of ratchet wheel 19 and is pivoted loosely on a rod 21 carried in the framework 6 and 8. Spring 22 normally holds it in engagement with the teeth of the ratchet wheel. A similar pawl is provided, of course, for each indicating wheel.

84 is the pawl and 17 the ratchet wheel for the minutes indicating wheel 11 (Fig. 12).

118 is the pawl and 15 the ratchet wheel for the tens of minutes indicating wheel 10 (Fig. 13) and 83' is the pawl and 13 the ratchet wheel of the hour indicating wheel 9 (Fig. 14).

The minute wheel is fed forward one unit at the conclusion of a full rotation of the tenths of minute wheel. For this purpose, its pawl 84 is normally held out of engagement with its ratchet wheel 17 by means of a wiper 83 fast on the sleeve 82 which carries pawl 84, the wiper resting on the periphery of a feeding control disk 18, which is fast to tenths of minute indicating wheel 12 and its ratchet wheel 19 (Figs. 11 and 17). Disk 18 is provided with a single detent 119. At the moment wheel 12 has made its full rotation, detent 119 of disk 18 comes opposite to wiper 83 of pawl 84 of the minute wheel. Up to this time the wiper had held pawl 84 out of engagement with the teeth of its ratchet wheel 17, but when the detent 119 comes opposite wiper 83, pawl 84 engages with a tooth of ratchet 17 and at the next actuation of feeding frame 25 the minute wheel is fed forward one unit. Immediately thereafter wiper 83 passes out of detent 119 and raises pawl 84 out of engagement. Exactly the same devices are used for feeding from the minutes to the tens of minutes and from the tens of minutes to the hours.

16 is the feeding control disk fast to the minutes wheel 11 and its ratchet 17.

14 is the disk fast to tens of minutes wheel 10 and its ratchet 15.

The hour indicating wheel 9 has, of course, no control disk connected with it.

85 is a side projection from the minute wiper 83. It lies over the pawl of the next pawl. Each pawl higher than the lowest is provided with such a side projection 85. In this way, the wiper 83 lifts all of the pawls of higher denomination out of contact with their ratchet wheels, except when wiper 83 enters detent 119. The indicating wheels are loose on shaft 29.

In Fig. 21 we have shown a plurality of our improved check time indicators, together with a plurality of elapsed time time recorders with a common operating circuit for actuating all of the indicators and time recorders and with clock-controlled means for controlling the common circuit. Referring to Fig. 21, 103, 101 and 102 represent three check time indicators and 98 and 100 represent elapsed time time recorders. The latter may be of any suitable construction and as their construction forms no part of the present invention, they are not shown in detail and will not be described, except to say that 120 and 121 represent the handles for the manual part of the operation of these time recorders and 122 and 123 represent the electromagnets for the two machines respectively which actuate the time timing mechanism of those machines. We prefer to use a form of elapsed time time recorder such as is shown in the application of James W. Bryce, one of the applicants herein, Ser. No. 436444, filed on the 3rd day of June, 1908, for improvements in time recorders.

The specific clock-controlled means for controlling the various machines of the system consist of a master-clock 86 and a circuit, which for convenience we shall call a clock circuit, containing a battery 89 and preferably two magnets 90 and 91, located on a control board 124, upon which check time indicator 103 is located. This clock circuit is made and broken every tenth of a minute. Any suitable means for this purpose may be employed. In Fig. 22, the device shown consists of an insulated toothed wheel 107 mounted on the arbor 108 connected with the minute mechanism of the clock. This wheel rotates once every minute. 104 and 106 are two arms fastened to insulated block 109. Arm 106 carries contact pin 105. Normally arm 104 and contact pin 105 are separated, but as wheel 107 rotates, arm 106 drops off from the tooth of each wheel an instant before arm 104 drops. During that instant, contact is made between 104 and 105. This energizes the clock circuit through battery 89, which runs as follows. From battery 89 through wire 88, arm 106, pin 105, arm 104, wire 87, wire 125, magnet 90, wire 126, switch 93, wire 127 back to battery. Thus for an instant every tenth of a minute magnet 90 is energized. This closes an electric circuit which, as shown, is common to all of the check time indicators and elapsed time recorders and operates them all. 96 is a battery of this circuit, and whenever magnet 90 is energized, the circuit is closed by armature 128 rising and making contact with contact pin 129, against the tension of its spring 130. The circuit thus made is as follows. From one side of battery 96 through wire 131, switch 92, wire 132, armature 128, and common wire 94 and back by common wire 95 to the other side of the battery. From the common wires 94 and 95, wires 133 and 134 connect with magnet 31 of check time indicator 103; wires 135 and 136 connect with the magnet 122 of elapsed time time recorder 98; wires 137 and 138 connect with the magnet 31 of check time indicator 101, wires 139 and 140 connect with the magnet 123 of elapsed time time recorder 100 and wires 141 and 142 connect with the magnet 31 of check time indicator 102.

143, 99, 144, 145 and 146 are the usual condensers for each of the instruments and are connected to the wires in the usual way.

From the above, it will be understood that every tenth of a minute through the clock-controlled means the common operating circuit through battery 96 and the magnets of the various instruments is made and broken, thus energizing and deënergizing the magnets which actuate the different instruments respectively. As shown, these various magnets are arranged in parallel in the common operating circuit. By these means a time indication is given at check time indicator 103 in the standard of time which is being used in all of the elapsed time time recorders of the system and in that by which time is indicated in all of the check time indicators of the system. In Fig. 21 we have shown three check time indicators, although it is obvious that for many purposes one would be enough in a system. This can be arranged at any convenient place near to or distant from any one or all of the elapsed time time recorders. Thus in a telephone system the check time indicator 101 may be placed at the desk of the clerk whose duty it is to receive calls, as for example, long distance calls. This would enable the clerk to make a manual entry of the time of receipt of any such call. The various subsequent steps taken in the process of carrying out the call could be similarly manually indicated in other parts of the same building or at distant points, by means of other check time indicators. Thus such indications, together with the automatic elapsed time indications of the elapsed time time recorder, connected with the recording of the actual elapsed time taken in the telephone conversation, are all made out on the same standard of time, as all of the instruments are in absolute time synchronism with one another. An accurate record can thus be kept of all of the steps and the times of taking them connected with any telephone interview. In a similar way, in a system of keeping a record of elapsed times of the work of employees or of the length of time of jobs, one or more check time indicators can be placed at any convenient points and the working of the system be checked or verified and any failure to work or defect in working be at once noticed at such point.

In Fig. 21 we have shown the clock circuit as provided preferably with a second magnet 91. This is for the purpose of enabling one magnet to be thrown out of operative connection and the other to be thrown in in case the first mentioned magnet needs adjustment or repair and so that this can be done without interference with the operation of the system. For this purpose we also provide in the common operating circuit an additional circuit controller 147, the same being the armature of magnet 91. When switch 93 in the clock circuit is thrown from contact point 148 to contact point 149, magnet 91 is energized through wire 150, 151 and the rest of the clock circuit, as already described. The circuit from battery 96 will then pass from switch 92 through wire 152 (instead of wire 132), to contact point 153, armature 147, wire 154, to common wire 94. Thus two circuit controllers 147 and 128 are provided in the common operating circuit, the one operative with magnet 90 and the other with magnet 91. We preferably also provide a second battery 97 in the common operating circuit so that in case of the failure of battery 96 there will be no interruption of the service. By throwing switch 92 from contact 155 to 156, battery 97 is thrown into operation through wire 157 connecting on one side of contact 156 and switch 92 and by wire 158 connecting on the other side with common wire 95.

We have found in practice that in the operation of a time recorder by magnetic means, as shown herein, it is necessary to cushion the operation of the parts, due to the extremely rapid operation of the mechanical parts by the magnetic means. For this purpose we provide an oil dash-pot 48 (Figs. 3, 4 and 7). We have found in practice that in a device of the character shown and described herein it is impossible to properly cushion the magnetically operated mechanism and distribute that operation, due to the magnetic pulse, over a sufficient length of time by means of springs or an air dash-pot. Springs are unsuitable, as the tension differs in different parts of their movement. We have found that air is too compressible and tends to give a springy and irregular action. The oil dash-pot, on the contrary, makes the movement of the parts slow, regular and steady, practically eliminating all noise and preventing injury to the mechanism. It is also essential that the dash-pot be always maintained in a vertical position, no matter what the position of the inclosing case, as the oil will leak unless this position is maintained. It is found in practice that machines of the character here described must be adapted to be used in different positions. For example, they are sometimes placed upon the wall and at other times upon tables or desks. In these two positions, the face of the indicator will occupy different planes, in one a vertical plane and in the other a horizontal plane. Unless the position of the dash-pot can be changed so as to maintain a vertical position in either of these positions of the machine, the device, we find, will be inoperative or its efficiency will be seriously impaired. For these reasons, we have devised means for always maintaining the oil dash-pot in a vertical position irrespective of the way in which the machine itself is placed. We accordingly provide means for adjusting the dash-pot relative to such machine so that when the latter is moved from its normal vertical position to a new vertical position, the dash-pot may still occupy a vertical position, and we preferably provide means for locking the dash-pot in any set position. In Figs. 4 and 7 we have shown the machine in two positions with the dash-pot adjusted so as to be vertical and to be locked in each position. In Figs. 8 and 9 we have shown a universal joint attachment between the dash-pot and the machine, so that the dash-pot will always automatically preserve its vertical position notwithstanding any change in the vertical position of the machine itself.

Referring first to the forms of device shown in Figs. 4 and 7, 48 is the oil dash-pot containing oil, as shown. 47 is a piston provided with the usual opening and 46 is the piston rod connected with it. Dash-pot 48 is pivoted to the side frame 6 at 49. At its upper end it is pivoted at 159 to a bell crank lever 44 loose on rod 21. The other arm of bell crank lever 44 is secured by a pin or screw 45, taking into a hole 55 in a bell crank 43 also loose on rod 21. The other arm of bell crank 43 is forked so as to embrace a pin 42 projecting from the side of arm 40, previously described. At each actuation of magnet 31, as lever 51 and feeding frame 25 are actuated, piston rod 46 and piston 47 are forced downward through the connections above described, thus operating the dash-pot. In order to adjust the position of the dash-pot in case the indicator is turned to a different position, as for example if it is given a quarter turn to the position shown in Fig. 7, so that the dash-pot may still be kept in a vertical position, we provide a screw-hole 111 in bell crank 43 and a stud 50 on side frame 6. When the machine is tipped on its side, as shown in Fig. 7, screw 45 is unscrewed from hole 55 and dash pot removed from stud 49 and the dash-pot and its connecting parts, are given a right-angle turn until screw 45 is opposite hole 111 and lower end of dash-pot 48 opposite stud 50. Screw 55 is then screwed into hole 111 and pin 49 forced into hole 50. The parts are then in the position shown in Fig. 7, with the dash-pot in a vertical position. It is practically impossible to operate with the dash-pot in any position other than vertical, as the oil will escape and the parts will not work properly. In both of the positions, that shown in Fig. 4 and that shown in Fig. 7, the parts are locked in the positions shown.

The above two positions are the only ones that, in practice, the machine is apt to be placed in, that of Fig. 4 illustrating the position in the top of a table or desk, and that of Fig. 7 the position of the parts as secured to a wall. But for any reason should it be desired to have a machine adapted to be tipped into any position, we have provided the universal joint attachment illustrated in Figs. 8 and 9, so that the dash-pot will always and automatically preserve its vertical position, notwithstanding any changes in the position of the indicator.

Referring now to the parts shown in Figs. 8 and 9, 77 represents the dash-pot, 78 the piston, 79 the cap screwed into the top of the piston to prevent spattering and 160 the piston rod. The dash-pot is mounted in a rotatable frame 75, having a cylindrical hollow neck 74 adapted to project into a cylindrical opening in framework 8 and free to turn in a cylindrical bearing 162 in side frame 8. 161 is a nut for securing the neck in place. The dash-pot is pivoted to frame 75 at 76 and the upper enlarged end of piston 160 is pivoted at 163 to a bell crank 71, pivoted at 72 to frame 75. Piston rod 160 is moved upward and downward through bell crank 71 by means of a link 69 pivoted to the bell crank at 70, 69 carrying on its other end an enlarged screw-threaded portion a screw-threaded cap 68. 66 is a link having an enlarged cylindrical head 67, upon which cap 68 and link 69 are free to turn. The above arrangement permits frame 75 carrying the dash-pot, bell crank and link 69 to turn to any desired angle, the parts being free to make a complete revolution if necessary, as shown by the circle 81 in dotted lines in Fig. 8. Link 66 at its other end is pivoted to the lower arm of a bell crank 63, pivoted at 64 to the framework and pivoted at its other end to a link 62, this link being loosely pivoted at its upper end to a stud 61 projecting from side 24 of pawl frame 25. Each time the pawl frame rises, it rocks bell crank 71, forcing piston rod 160 and piston 78 downward in dash-pot 77. This operation takes place no matter what the relative position of frame 75 and dash-pot 77 with reference to the frame of the indicator.

60 is a counterweight mounted on the end of a lever 59, loosely pivoted on rod 29. This is fastened by screw 57 to a lever 56 secured to pawl frame 25 by means of rod 27. A screw hole 58 is provided in 59 so that counterweight may be changed to the proper position when dash-pot 48 is changed.

In order to prevent overthrow of the feeding pawls 26, 84, 118 and 83 and to prevent overthrow of the various ratchet wheels and their indicating wheels at each feeding operation, we provide a stop bar 30 secured in the side frames 6 and 8, against which the pawls strike when they have reached the upward limit of their motion. The back of each tooth is provided with a curved face and the noses of the pawls are provided with similarly curved surfaces to engage with the curved backs of the teeth of the ratchet wheels, as shown in Fig. 11, and these parts and the rod are so arranged and proportioned that when the pawls strike the rod 30 they will lock the ratchet wheels from further rotation. This insures an exact feeding of the ratchet wheels at each operation and at the same time permits a ready withdrawal of the pawls to their normal positions.

Modifications and changes may, of course, be made in the specific devices shown in the patent without departing from our invention.

What we claim as new and desire to secure by Letters Patent, is:—

1. The combination of a time recorder, a check time indicator, an electromagnet for actuating the time recorder, an electromagnet for actuating the indicator, a common operating electric circuit through both magnets, a source of electric energy therein, two circuit controllers in the operating circuit, a clock movement, a clock circuit containing a source of electric energy, a circuit controller therein adapted to be opened and closed at regular stated intervals of time to make or break said circuit, two electromagnets arranged in said clock circuit in parallel with each other, each magnet adapted to control one of the circuit controllers of the common operating circuit, and a switch for cutting one or the other of said magnets in the clock circuit into or out of circuit with the circuit controller and source of electric energy of the clock circuit.

2. In a time indicating machine the combination of an oil dash-pot to cushion the operation of the machine arranged in a vertical position in said machine, and means for adjusting the dash-pot relative to the machine, whereby when the machine is moved from its normal vertical position to a new vertical position, the dash-pot may still occupy a vertical position.

3. In a time indicating machine the combination of an oil dash-pot to cushion the operation of the machine arranged in a vertical position in said machine, and a universal joint attachment between the dash-pot and the machine, whereby the dash-pot will always automatically preserve its vertical position, notwithstanding changes in the position of the machine.

4. In a time indicating machine the combination of an oil dash-pot to cushion the operation of the machine arranged in a vertical position in said machine, means for adjusting and locking the dash-pot relative to the machine, whereby, when the machine is moved from its normal vertical position to a new vertical position, the dash-pot may be moved into and locked in such a new position relative to the machine as will still keep the dash-pot vertical.

5. In the operating mechanism of a time indicating machine the combination of a driving pawl, a ratchet wheel adapted to be rotated thereby and provided with teeth and with curved surfaces between the teeth, means for giving the pawl a swinging movement to cause it to engage with the teeth and curved surfaces of the ratchet wheel, and a stop between which and the ratchet the pawl will become wedged to stop both pawl and ratchet and to prevent overthrow of the latter.

6. In the operating mechanism of a time indicating machine the combination of a driving pawl provided with a nose having a curved surface, a ratchet wheel adapted to be rotated thereby and provided with teeth and with curved surfaces between the teeth, means for giving the pawl a swinging movement to cause its nose to engage with a tooth of the ratchet and its curved surface to engage with one of the curved surfaces of the ratchet.

7. In the operating mechanism of a time indicating mechanism the combination of a driving pawl, a ratchet wheel adapted to be rotated thereby, means for giving the pawl a swinging movement to cause it to engage with the teeth of the ratchet, and a stop, the parts being so shaped and arranged that the pawl will become wedged between the stop and the ratchet wheel to stop both pawl and ratchet and to prevent overthrow of the latter.

8. In the operating mechanism of a time indicating mechanism the combination of a driving pawl, a ratchet wheel adapted to be rotated thereby, means for giving the pawl a swinging movement to cause it to engage with the teeth of the ratchet, and a stop, the parts being so shaped and arranged that the pawl will become wedged between the stop and the ratchet wheel to stop both pawl and ratchet and to prevent overthrow of the latter, and so that the pawl may be easily withdrawn from such wedging or locking position.

9. In the operating mechanism of a time indicating machine the combination of a series of driving pawls, each pawl provided with a nose having a curved surface, a common swinging frame for carrying and actuating the pawls, a series of ratchet wheels, one for each pawl, adapted to be rotated by the pawls, each ratchet wheel provided with teeth and with curved surfaces between the teeth, means for giving the swinging frame a swinging movement, a stop bar between which and the ratchet wheels the pawls are adapted to become wedged, whereby overthrow of pawls and ratchet wheels will be prevented.

In testimony whereof, we have signed our names to this specification, in the presence of two subscribing witnesses.

HARRY T. GOSS.
    JAMES W. BRYCE.

Witnesses:
 EDWIN SEGER,
 GEO. M. HARRIS.